Dec. 27, 1927.
R. S. EMMET
1,653,994
TOOL FOR GOLF GREENS AND THE LIKE
Filed Sept. 20, 1926
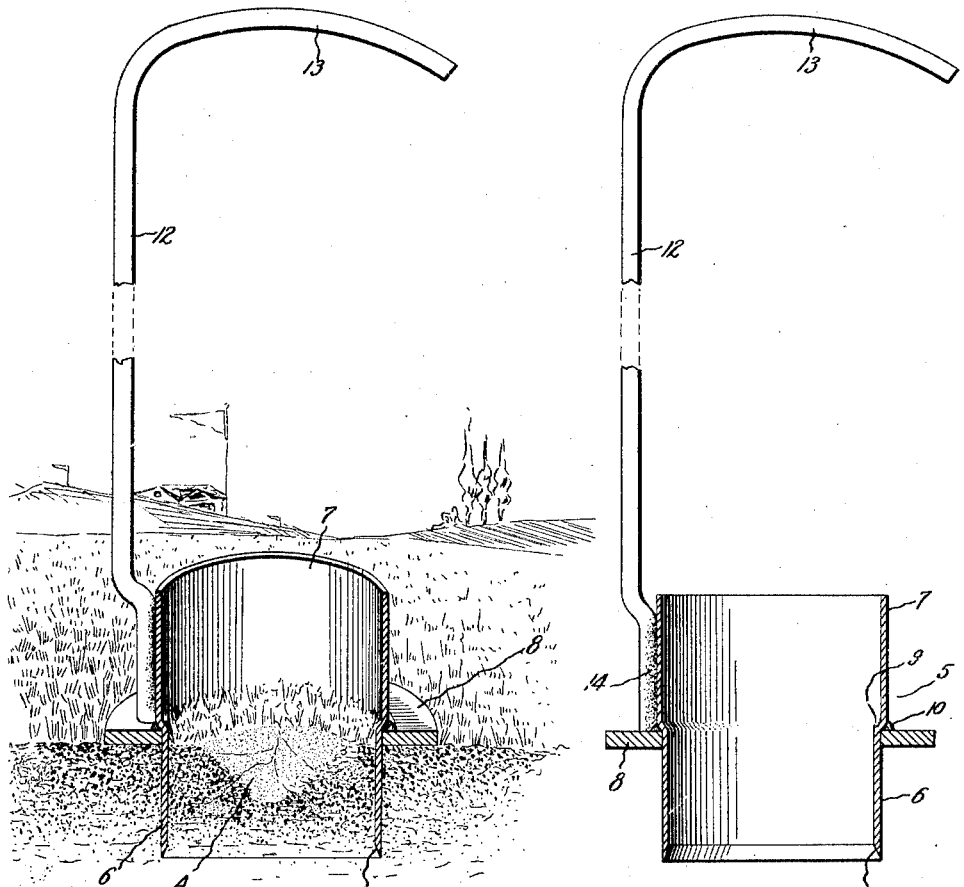
Inventor:
Richard S. Emmet,
by *Alfred E. Bober*
His Attorney.

Patented Dec. 27, 1927.

1,653,994

UNITED STATES PATENT OFFICE.

RICHARD S. EMMET, OF SCHENECTADY, NEW YORK.

TOOL FOR GOLF GREENS AND THE LIKE.

Application filed September 20, 1926. Serial No. 136,425.

In connection with golf greens, lawns and other places where it is desired to keep the ground covered evenly and uniformly with grass kept closely mown, difficulty is experienced with ants forming ant hills in the ground thereby producing an unevenness and killing the grass in and around the borings. This is especially objectionable on golf greens. Also, difficulty is experienced with bare spots and with spots where the grass is poor.

My invention relates to a tool for use in connection with golf greens, lawns and the like for removing ant hills, bare spots or poor spots in the grass and substituting for the removed turf a plug of good grass-covered turf.

The primary object of my invention is to provide an improved tool for this purpose which is simple in structure, easy to use, capable of being manufactured at a low cost, and efficient for its intended purpose.

Other objects of my invention and the advantages of it are pointed out in and will appear from the following description.

For a consideration of what I believe to be novel and my invention, attention is directed to the following specification and the claims appended thereto.

In the drawing, Fig. 1 is a sectional view of a tool embodying my invention, the same being shown in a manner to illustrate the way in which the tool is used, and Fig. 2 is a sectional view of the tool by itself.

Referring to the drawing, the tool comprises a cylinder 5 having a lower portion 6 and an upper portion 7, the upper portion 7 being of a diameter slightly greater than the lower portion. Cylinder 5 may be formed in any suitable manner. For example, it may be formed from a piece of seamless tubing or it may be formed from a blank of sheet material rolled to the desired shape and provided with either a welded or an open joint. Preferably, I form the cylinder from seamless tubing, one end being expanded to form the upper portion 7. Between the lower portion 6 and the upper portion 7 is an annular collar or flange 8 which surrounds cylinder 5 and serves as a stop to limit the depth to which the tool may be inserted into the ground. Flange or collar 8 may be inserted over lower portion 6 and brought into engagement with the shoulder 9 which is formed between the upper and lower portions, and then be fastened in position in any suitable manner such as by being welded in position as is indicated at 10. Shoulder 9 serves as a stop or flange for collar 8 and to give it a firm seating, holding it fast against upward movement.

Cylinder 5 is formed from material of suitable thickness and the lower end of portion 6 is beveled on its inner surface as is indicated at 11 to provide a sharp cutting edge, such cutting edge being of a diameter greater than the inside diameter of portion 6 and preferably of a diameter equal to the outside diameter of portion 6.

Fastened to cylinder 5 is a handle 12 having an inturned portion 13 at its upper end to be held in the hand. The handle is made of suitable length and may be attached to cylinder 5 in any suitable manner such as by welding, rivets or the like. In the present instance, I have shown it as being welded to cylinder 5, the weld being indicated at 14. This forms an advantageous means for fastening the handle to the cylinder as it provides a strong connection and one which can be provided at small cost.

In the use of the invention, the operator may first cut with the tool a number of plugs of turf covered with good grass, the plugs being cut from a reserve patch of grass intended for the purpose. This is done by placing the lower edge of the tool on the grass and then pressing the tool down with the foot until collar or flange 8 strikes the ground. In other words, the tool is forced down as far as it will go. The upper end of cylinder 5 is flat as is shown in the drawing so that the foot may be placed on top of it in pressing it into the ground. This forms an easy and convenient way for forcing the tool into the ground. By reason of beveled edge 11, the tool cuts out a plug of a diameter slightly larger than the inside diameter of portion 6, and as a result, such plug is squeezed up into portion 6 with a fairly tight fit so it is held firmly therein. The wall of portion 6 is perfectly straight so that a plug of uniform diameter is cut out. The tool is now pulled from the ground, the plug coming out with it since as just pointed out, the plug is held firmly in portion 6. The tool is then inserted into the turf at a new point and in the manner already described. This cuts out another plug, the second plug as it enters portion 6 forcing the first plug from portion 6 up into upper portion 7. In this connection, it will be noted that portion 7 is somewhat longer than portion 6 so that a plug from portion 6 may enter portion 7 even though the foot of the operator is on top of it. The first plug which was cut is then removed from portion 7 with the hand and is placed on a suitable carrier, it being readily removable from portion 7 owing to the fact that portion 7 is of a greater diameter than portion 6 and hence of greater diameter than the plug forced out of portion 6. This operation is continued until the desired number of plugs have been cut from the reserve patch and placed on the carrier, each new plug cut forcing the previous one out of portion 6 into portion 7. In connection with the use of the tool, the flange 8 in each instance limits the distance which the tool goes into the ground so that all the plugs cut are of the same size. In the present invention, I have shown portion 7 of a length such that it is adapted to hold only a single plug. However, if found desirable it may be made of a length relatively long to portion 6 so that it is adapted to hold more than one plug.

The operator may then take the tool and the carrier with the good plugs of grass-covered turf thereon over to the golf green, lawn or other place where the grass is to be repaired. In the case of an ant hill, the tool is then placed over it and forced down with the foot until the flange 8 strikes the ground. This is illustrated in Fig. 1 where A indicates an ant hill to be removed. The tool is then pulled out, thus lifting out the upper portion of the ant hill. A suitable poison may be placed now in the bottom of the hole to kill the ants and then a plug of the good grass put in the hole and pressed down with the foot. Since the plug which is put into the hole is the same size as the one taken out it fits nicely and when pressed down it comes flush with the surface of the ground. When the next ant hill is cut out, the first one is forced up into upper portion 7 of the cylinder and may be removed with the hand and put into a suitable container. The tool may be used continuously in this manner. In the case of bare spots or spots of poor grass in the golf green, lawn or the like, plugs of such spots may be removed in the manner described and replaced with plugs bearing good grass.

The tool has great utility also as a means for improving greens or lawns of inferior grass. By the use of the tool in the manner already described, it is possible readily to plug fine spreading grass into turf bearing inferior grass thus improving to any desired extent the character of the grass on the turf. I consider this as being one of the important uses of the tool and a use which lends to the tool great utility from a practical standpoint.

If found desirable, the plugs cut from the golf green lawn or the like may be placed in the holes formed in the reserve patch where the good plugs were removed, the fact that the tool is adapted to cut all plugs of exactly the same size making this readily possible.

My improved tool has the important advantage that it is very simple in structure, it being capable of being manufactured from only three parts, a cylinder, a collar and a handle, suitably fastened together. This means that it can be manufactured at low cost. Also the tool has the advantage that it is simple to use, requiring no skill on the part of the operator in order to use it efficiently. The collar 8 definitely defines or fixes the thickness of the plugs so that all plugs are exactly of the same size; and they are easily cut to this size by merely forcing the tool into the ground as far as it will go.

The tool is light in weight so that the operator may hold it in one hand, and since it may be pressed into the ground with the foot, the other hand of the operator is left free to take plugs out of the top of the tool. As a result, by use of the tool, plugs may be cut very rapidly one after another. At the same time rapid use of the tool requires but slight effort on the part of the operator.

In accordance with the provision of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

In a device of the character described, the combination of a cylindrical member having a portion of smaller diameter and a portion of larger diameter, the portion of smaller diameter having a sharp edge and being of uniform diameter throughout its length whereby a plug cut out with the portion of smaller diameter will fit a hole cut with such portion, a flange on the member intermediate between its ends, which forms a stop to limit the depth to which the tool may be forced into the ground, and a handle connected to the chamber.

In witness whereof, I have hereunto set my hand this 16th day of September, 1926.

RICHARD S. EMMET.

CERTIFICATE OF CORRECTION.

Patent No. 1,653,994. Granted December 27, 1927, to

RICHARD S. EMMET.

It is hereby certified that error appears in the printed specification of the above numbered patent requiring correction as follows: Page 2, line 116, in claim, for the word "chamber" read "member"; and that the said Letters Patent should be read with this correction therein that the same may conform to the record of the case in the Patent Office.

Signed and sealed this 24th day of January, A. D. 1928.

Seal.

M. J. Moore,
Acting Commissioner of Patents.